United States Patent [19]

Bareket

[11] Patent Number: 4,712,913
[45] Date of Patent: Dec. 15, 1987

[54] LINEAR-SCANNED-ARRAY WAVEFRONT SENSOR

[75] Inventor: Noah Bareket, San Jose, Calif.

[73] Assignee: Lockheed Missles & Space Company, Inc., Sunnyvale, Calif.

[21] Appl. No.: 935,900

[22] Filed: Nov. 28, 1986

Related U.S. Application Data

[63] Continuation of Ser. No. 522,678, Aug. 12, 1983, abandoned.

[51] Int. Cl.$^4$ .............................................. G01B 11/26
[52] U.S. Cl. ...................................... 356/121; 356/152
[58] Field of Search ........................ 356/121, 152, 141; 250/201

[56] References Cited

U.S. PATENT DOCUMENTS

| | | | |
|---|---|---|---|
| 4,193,689 | 3/1980 | Reymond et al. | 356/152 |
| 4,239,392 | 12/1980 | Pohle | 356/354 |
| 4,429,993 | 2/1984 | Schick | 356/152 |

FOREIGN PATENT DOCUMENTS

0124007 9/1980 Japan ................... 356/121

*Primary Examiner*—R. A. Rosenberger
*Assistant Examiner*—Crystal D. Cooper
*Attorney, Agent, or Firm*—John J. Morrissey

[57] ABSTRACT

A plurality of sample beam wavefronts derived from selected portions of a wide-aperture outgoing optical beam wavefront enter an entrance pupil (11) located adjacent a focal surface (12) on which the sample beams are individually focussed. A relay lens system (13) transmits the sample beams to a beam splitter (14), which divides each of the sample beams into an undeviated component and a diviated component. The undeviated components of the various sample beams image the entrance pupil (11) on a first scanning mirror (15), and the deviated components image the entrance pupil (11) on a second scanning mirror (16). The focal surface (12) is reimaged by the relay lens system (13) onto focal planes (17 and 18), respectively, so that the foci of the individual sample beams appear as spots on the focal planes (17 and 18). The scanning mirrors (15 and 16) are ditherable to sweep each of the sample bean spots across a plurality of maching rows of linear photodector arrays positioned at each of the focal planes (17 and 18). Line centroids of the various line images of the samle beam spots are calculated by the centroid processor (19) from quantitative measurements of the irraddiance distributions of the line images at the focal planes (17, and 18) This calculation, which can be performed continuously in real time, provides an indication of the form of the wide-aperture outgoing wavefront.

11 Claims, 6 Drawing Figures

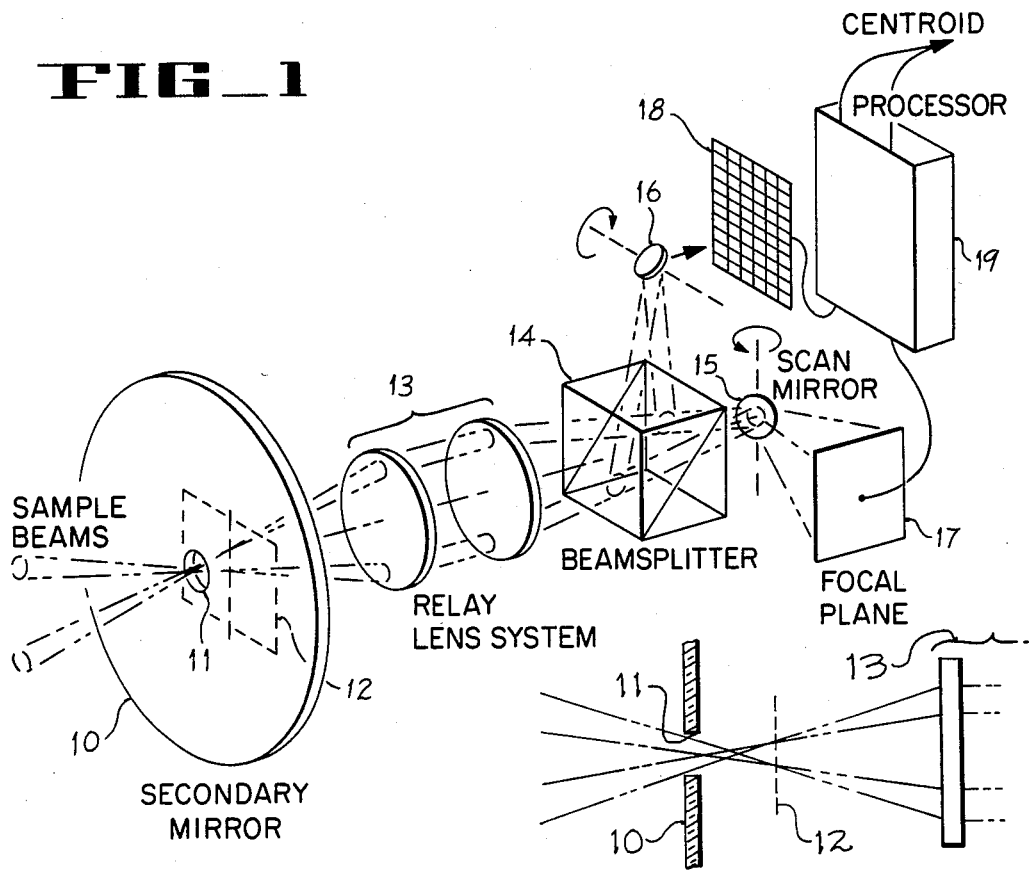
FIG_1
FIG_1A
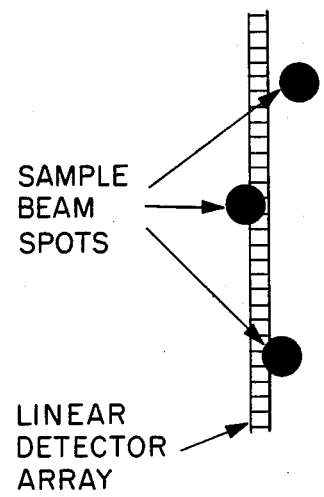
FIG_2
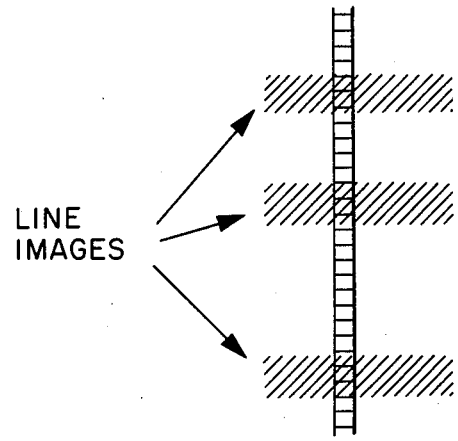
FIG_3

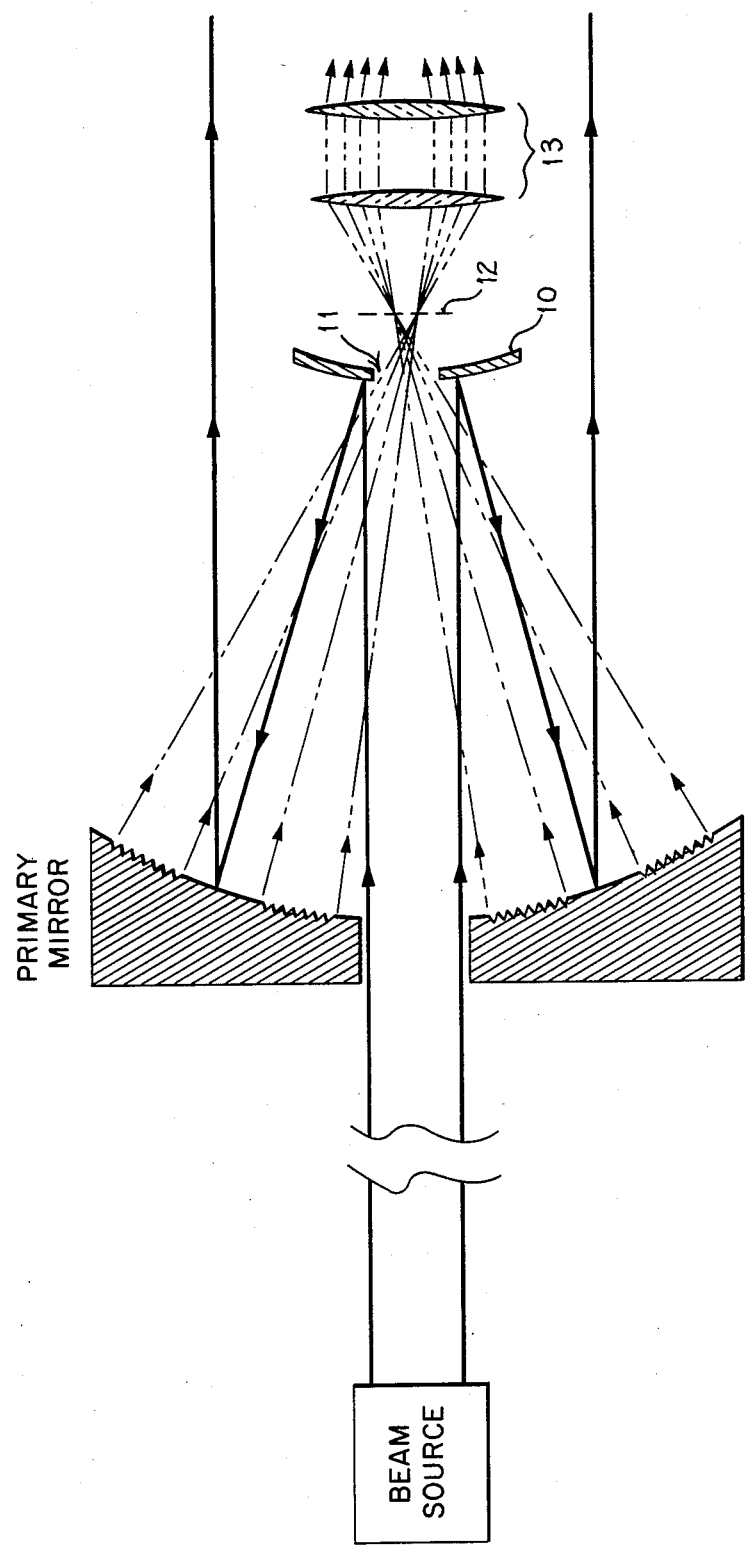
FIG_1B

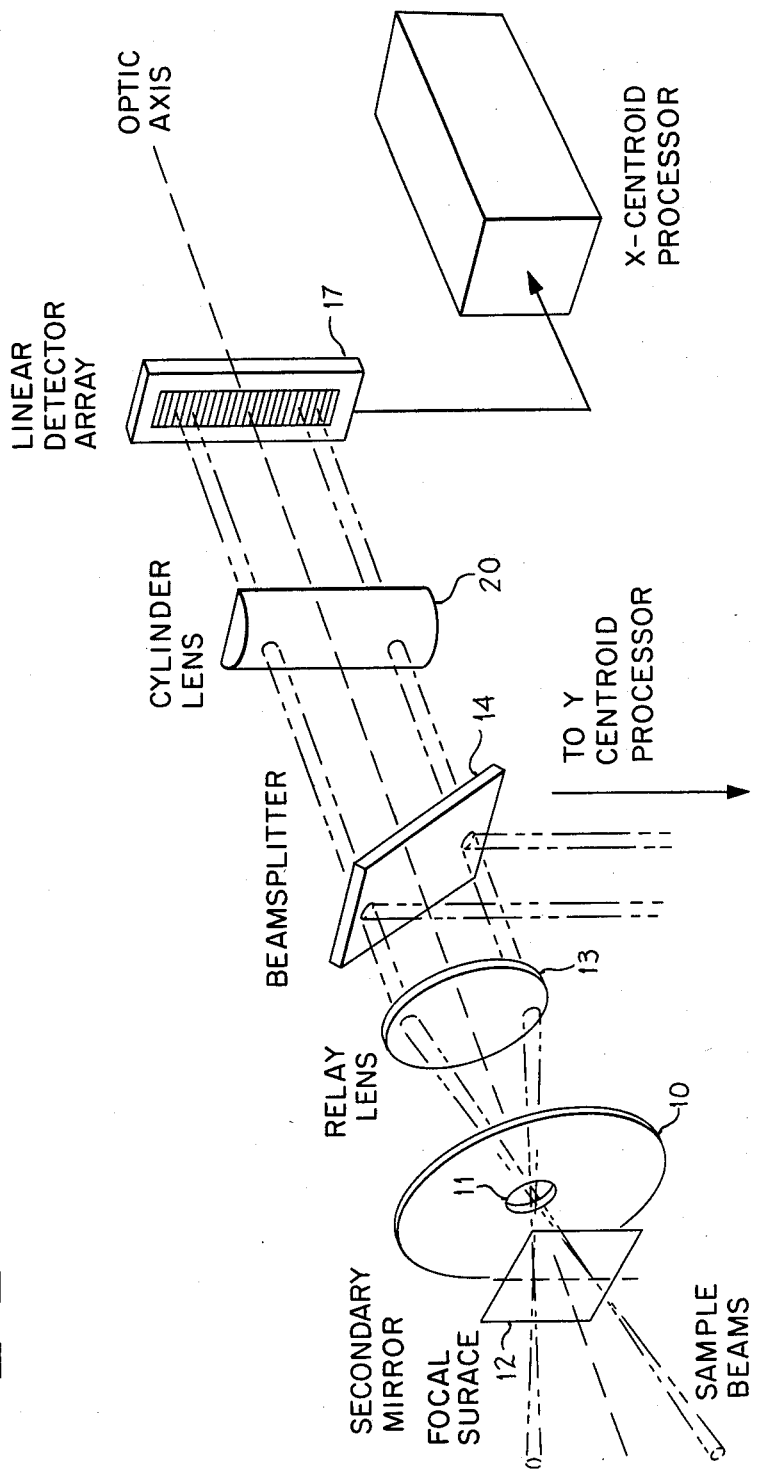
FIG—4

LINEAR-SCANNED-ARRAY WAVEFRONT SENSOR

This application is a continuation of Ser. No. 522,678, filed Aug. 12, 1983, now abandoned.

TECHNICAL FIELD

This invention relates generally to optical beam control systems, and more particularly to wavefront sensors of the Hartmann type for sensing wavefront aberrations of outgoing laser beams.

DESCRIPTION OF THE PRIOR ART

Various types of wavefront sensors for outgoing optical beams have been described in the prior art, e.g., U.S. Pat. Nos. 4,326,800; 4,273,446; and 4,239,392. However, very few wavefront sensors for outgoing high-energy laser beams have actually been field-tested to demonstrate operational capability.

In a typical outgoing laser beam wavefront sensor as described in the prior art, a means is provided for sampling the wavefront to detect the occurrence of aberrations due to, e.g., optical train distortions, and/or aberrations attributable to the laser beam source. In general, full-aperture wavefront sampling is impractical for beams produced by wide-aperture high-energy laser systems. Consequently, a sampling technique based upon the classical Hartmann test as used in the prior art for analyzing optical beam quality has been proposed for sensing aberrations in wide-aperture laser beam wavefronts.

It was suggested in the prior art to provide a pattern of holographically produced gratings on the reflective surface of a beam-expanding primary mirror in a large-aperture optical system, so that light from selected portions of the outgoing wavefront reflected from the primary mirror can be diffracted into a number of subaperture beams focussed onto a common focal plane for analysis. Using this technique, in analogy to the Hartmann test, the wavefront phase of the full-aperture wavefront can be reconstructed from the slope of the diffracted subaperture wavefronts or, equivalently, from the positions of the subaperture beam spot images formed on a detector located at the focal plane. This technique was described in an article entitled "Wavefront Sensors and Deformable Mirrors for Visible Wavelengths" by N. Bareket and L. T. James, published in Proceedings of the Society of Photo-Optical Instrumentation Engineers, Vol. 228, pp. 4–13, (1980).

In applying a Hartmann-type subaperture sampling technique to the analysis of a wide-aperture wavefront, it is necessary to provide a wavefront sensor for tracking many individual subaperture sample beams at a rate determined by the control bandwidth of the optical system. A variety of position sensing and tracking techniques have been used in the prior art for target tracking, and could in principle be adapted for prior art Hartmann-type subaperture wavefront sampling. However, specific operational requirements of many types of wide-aperture optical systems, especially high-energy laser systems, preclude straightforward application of position sensing and tracking techniques of the prior art to Hartmann-type subaperture wavefront sensing.

Quadrant-cell tracker devices known to the prior art are generally limited in linearity and dynamic range, and hence are unsuited for use as wavefront sensors in many types of high-energy laser systems. Imaging trackers employing large two-dimensional starring arrays for position sensing are linear over a large dynamic range, but can generally be operated only at low temporal bandwidths. Furthermore, for applications in the infrared wavelengths, commercially available detector arrays are expensive and limited in performance.

SUMMARY OF THE INVENTION

It is an object of the present invention to provide an outgoing beam wavefront sensor of the Hartmann type for sensing wavefront aberrations in wide-aperture optical systems.

It is a particular object of the present invention to provide a Hartmann-type outgoing laser beam wavefront sensor that is linear over a large dynmaic range and operable at high frame rates, and which can be operated over a wide spectral bandwidth that includes the infrared wavelengths.

Specifically, it is an object of the present invention to provide a linear-scanned-array wavefront sensor of the Hartmann type for use in analyzing outgoing beam wavefronts in wide-aperture optical systems such as high-eqergy laser systems.

The linear-scanned-array wavefront sensor of the present invention can maintain a large dynamic range at high frame rate, and can be readily constructed using commercially available components. A tracking algorithm that was used in the prior art in connection with imaging trackers, (vis., the basic algorithm for centroid estimation) is used in the present invention to determine the centroid of the irradiance distribution of subaperture beam spot images produced by Hartmann-type sampling of a wide-aperture outgoing beam wavefront. The present invention thereby effectively reduces the two-dimensional centroid measurement problem to a one-dimensional problem.

The centroid $(\bar{x}, \bar{y})$ of the irradiance distribution $E(x,y)$ of the subaperture beam spots produced by the Hartmann sampling technique can be estpmated by using the algorithm:

$$\bar{x} = \frac{\int\int x\, E(x,y)\, dx\, dy}{\int\int E(x,y)\, dx\, dy}$$

$$\bar{y} = \frac{\int\int y\, E(x,y)\, dx\, dy}{\int\int E(x,y)\, dx\, dy}$$

The fastest way to perform this algorithm with a discretely sampled irradiance distribution is to calculate the line integral first, then to multiply by the position variable, and finally to sum. The order of integration becomes:

$$\bar{x} = \int x [\int E(x,y)\, dy]\, dx$$

for the $\bar{x}$ coordinate, and $$\bar{y} = \int y [\int E(x,y)\, dx]\, dy$$

for the $\bar{y}$ coordinate. Thus, the two-dimensional centroid measurement can be performed by making two parallel uniaxis measurements, to wit, by performing an optical (or other type of analog) integration of the bracketed line integral in the above equation along one axis, and by simultaneously tracking along the other axis that is orthogonal thereto.

Optical integration can be performed in various ways, e.g., by using cylindrica lenses (i.e., anamorphic optics);

by using detector elements of large aspect ratio; or by dithering the subaperture beam spot images across integrating detectors. The latter technique (i.e, dithering) has a number of advantages: it is simple to implement, it uses components that can be compactly packaged, and it does not introduce optical aberrations. Accordingly, the dithering technique has been adopted in implementihg the preferred imbodiment body of the present invention.

DESCRIPTION OF THE DRAWING

FIG. 1 is a schematic representation of a linear-scanned-array wavefront Sensor according to the present invention.

FIG. 1A is a cross-sectional view of a portion of the sensor of FIG. 1 indicating the forcussing of the sample beams, and showing the locations of the pupil planes and the object plane.

FIG. 1B is a cross-sectional schematic view of a diffraction technique for producing the sample beams shown in FIG. 1.

FIG. 2 is a representation of a section of the focal plane of the wavefront sensor of FIG. 1 showing a number of subaperture beam spot images.

FIG. 3 is a representation of line images of the subaperture beam spots obtained by dithering the scan mirror of FIG. 2.

FIG. 4 is a schematic representation of an alternative embodiment of a linear-scanned-array wavefront sensor according to the present invention wherein optical integration is performed by anamorphic optics.

BEST MODE OF CARRYING OUT THE INVENTION

A linear-scanned-array wavefront sensor according to the present invention, as illustated schematically in FIG. 1, functions to sense and track subaperture beam wavefronts (also called "sample beam" wavefronts) that are obtained from a wide-aperture outgoing optical beam wavefront such as a high-energy laser beam wavefront. The sample beam wavefronts are produced by a Hartmann-type sampling of selected portions of the wavefront of the wide aperture outgoing optical beam. The focussing of the sample beams on the focal suface 12 is illustrated in detail in inset FIG. 1A.

There are a number of techniques whereby the sample beams whose wavefronts are to be sensed and tracked by the apparatus of the present invention can be obtained. According to one such technique, as described in U.S. Pat. No. 4,273,446 to R. H. Pohle, the wide-aperture outgoing beam is reflected from the concave surface of a beam-expanding primary mirror (not shown in FIG. 1) onto a secondary mirror 10. A plurality of holographically produced gratings are provided at selected places on the reflective surface of the primary mirror so that each of the gratings generates a zeroth order and higher order diffraction components of a corresponding selected portion of the wave front of the wide-aperture outgoing beam.

A schematic illustrantion of the diffraction technique described in the aforesaid patent to R. H. Pohle is provided in FIG. 1B, wherein an outgoing optical beam from an unspecified source (e.g., a high-energy laser) is shown passing through an aperture in the primary mirror toward the convex reflecting surface of the secondary mirror 10. At the secondary mirror 10, the beam is reflected back to the concave reflecting surface of the primary mirror. At the primary mirror, the beam is expanded and reflected afocally parallel to the original direction of the outgoing beam from the source. A plurality of diffraction gratings are provided (as etching or any other conventional procedure) at appropriate locations on the concave surface of the primary mirror so that the first order diffraction components of those portions of the beam incident upon the diffraction gratings are converged to the focal surface 12.

In FIG. 1B, first order diffraction components reflected from various diffraction gratings on the primary mirror are shown converging to foci (i.e., "spots") on the focal surface 12 adjacent the entrance pupil 11 of the secondary mirror 10. These first order diffraction components serve as sample beams representative of corresponding portions of the outgoing beam from the source.

The primary mirror at which the sample beams indicated in FIG. 1 are produced is configured so that the zeroth order diffraction components (which are the high-energy components) of the portions of the outgoing beam refletted from the gratings on the primary mirror are reflected afocally in a direction that is generally parallel to the direction in which the remaining portions of the outgoing beam are reflected from those regions of the primary mirror where there are no gratings. However, the first order diffraction components of the portions of the outgoing beam reflected from the gratings on the primary mirror are all reflected so as to converge to a common focal surface (preferably a planar surface). The wavefronts of these first order diffraction components effectively serve as "samples" of selected portions of the wavefront of the wide-aperture outgoing beam.

As illustrated in FIG. 1, the "sample beams" (whether produced by the diffraction technique described above or by some other technique) converge through an entrance pupil 11 on the secondary mirror 10 and are individually focussed on a focal surface 12 located downstream of the entrance pupil 11. Envelopes of rays representing two different sample beams are shown in FIG. 1. In accordance with ray-tracing convention, the rays representing the sample beams proceed from left to right in the drawing.

A relay lens system 13, which generally comprises one or more lens elements, is located downstream of the focal surface 12. The relay lens system 13 collimates the various sample beams and transmits them to a beam splitter 14, which divides each of the sample beams into two components, viz., an undeviated component that passes to a first scanning mirror 15, and a deviated component that emerges from the beam splitter 14 at an angle with respect to the direction of the undeviated component and passes to a second scanning mirror 16. The entrance pupil 11 is thereby imaged on each of the scanning mirrors 15 and 16.

The beam splitter 14 could be a conventional device such as a cube beam splitter marketed by Melles-Griot under Catalog No. 03BSC003. In principle, the angle at which the deviated component of a particular sample beam emerges from the beam splitter 14 relative to the direction of the undeviated component of that same sample beam is not critical to the invention. In practice, however, it is convenient to use a beam-splitting technique that causes the deviated component to emerge in a direction orthogonal to the direction of the undeviated component.

The scanning mirror 15 reflects the undeviated components of the various sample beams to a focal plane 17, and the scanning mirror 16 reflects the deviated components of the various sample beams to a focal plane 18. The relay lens system 13 causes the foci of the individual sample beams on the focal surface 12 (as illustrated in FIG. 1A) to be reimaged onto the focal planes 17 and 18, so that the various sample beams form spots on the focal planes 17 and 18. Time integrating photodetectors, each of which comprises a number of columns of linear photodetector arrays, are positioned at the focal planes 17 and 18. The linear photodetector arrays could be, e.g., of the type marketed by Reticon Corporation of Sunnyvale, Calif. (a subsidiary of EG&G, Inc.) for applications involving visible wavelengths, or of the type marketed by Spiricon Inc. of Logan, Utah for applications involving infrared wavelengths. The linear photodetector arrays act independently of each other to measure the irradiance distributions of the sample beam spots formed on the focal planes 17 and 18.

A single linear photodetector array of the type positioned at one of the focal blanes 17 or 18 is illustrated in FIG. 2, along with a representation of three sample beam spots formed thereon. It is noted that any particular sample beam spot as shown in FIG. 2 might be only partially incident upon, or might completely miss being incident upon, the linear photodetector array.

The scanning mirrors 15 and 16 are ditherable about corresponding axes, which are parallel to the corresponding focal planes 17 and 18, respectively. By dithering either scanning mirror 15 or 16 about its axis, the sample beam spots appearing at the corresponding focal plane 17 or 18 are swept across the linear photodetector array so as to create line images as illustrated in FIG. 3. These line images of the sample beam spots span the full deviation range of the wide-aperture optical system, and therefore always remain within the capture range of the linear photodetector array.

The line controids of the sample beam spots at each of the focal planes 17 and 18 are calculated by means of a centroid processor 19, which performs a quantitative measurement of the irradiance distribution of each corresponding line image along the axis perpendicular to the sweep direction of the line image. Preferably, a plurality of linear array of photodetectors is positioned at or immediately adjacent each of the focal blanes 17 and 18. These linear arrays can be either multiplexed or interrogated in parallel. A sequential data stream consisting of voltage measurements proportional to the light-intensity incident upon the corresponding photodetector elements of each linear array of photodetectors is then digitized by the centroid processor 19.

The centroid processor 19 could be a general purpose computer, or for high-speed processing applications could be a hard-wired signal processor specifically designed to perform the required calculations. Two identical channels, which are defined by an abscissa-defining axis and an ordnate-defining axis (preferably orthogonal to each other) as determined by the orientations of the photodetector arrays at the focal planes 17 and 18, are provided for making the irradiance distribution measurements. The centroid processor 19 calculates the centroid of each beam spot by the algorithm $$\bar{x} = \int x [\int E(x,y) \, dy] \, dx.$$

in its discrete form. Theoretically, the measurement rate is limited either by the speed of the centroid processor 19 or by the read-out time of the photodetector arrays. However, in practice the photodetector read-out time is the limiting parameter. Any deviation of the line centroid of the beam spot of one of the beam spots of other of the sample beams is an indication of an aberration in the wavefront of the outgoing optical beam.

In an alternative embodiment of the invention, analog integration of the components of the individual sample beams is performed by anamorphic optics. As shown in FIG. 4, the secondary mirror 10 could be positioned downstream of the focal surface 12 to which the sample beams are focussed, and the relay lens system 13 (positioned downstream of secondary mirror 10) could comprise a single-element lens. The relay lens system 13 relays the sample beams passing through the entrance pupil 11 on the secondary mirror 10 after diverging from the focal surface 12. it is actually immaterial whether the entrance pupil 11 is upstream or downstream of the focal surface 12.

The beam splitter 14 positioned downstream of the relay lens 13 divides each sample beam into two components. The anamorphic optics characteristic of the embodiment shown in FIG. 4 includes a first cylinder lens 20 positioned in the path of those sample beam components transmitted in a first direction by the beam splitter 14, and a second cylinder lens (not shown) positioned in the path of those sample beam components transmitted in the other (preferably orthogonal) direction by the beam splitter 14.

As illustrated in FIG. 4, the first cylinder lens 20 magnifies the sample beam spots only along one axis (e.g., the abscissa-defining axis or x-axis). Subsequently, a line image along the x-axis is generated on the linear array of photodetectors at the focal plane 17, with the axis of the line image being parallel to the axis of the linear array of photodetectors. Similarly, the other cylinder lens (not shown in FIG. 4) magnifies the sample beam spots along the other axis (i.e., the ordinate-defining axis or y-axis) which in the preferred embodiment illusrated in FIG. 4 is orthogonal to the abscissa-defining axis. A line image along the y-axis is then generated on the linear array of photodetectors at the focal plane 18 (not seen in FIG. 4). The algorithm for performing the line certroid calculations is the same as that used in the embodiment described in connection with FIG. 1.

Particular embodiments have been described herein for a linear-scanned-array wavefront sensor in accordance with the present invention. However, other embodiments suitable for particular applications would become apparent to workers skilled in the art upon perusal of the foregoing specification and accompanying drawing. The description presented herein is to be understood as illustrative of the invention, which is more generally defined by the following claims and their equivalents.

I claim:

1. An apparatus for sensing aberrations in an optical beam wavefront, said apparatus comprising:

(a) means for producing a plurality of sample beams, each sample beam having a wavefront representing a corresponding portion of the optical beam wavefront in which said aberrations are to be sensed, and for converging said sample beams to form corresponding focussed sample beam spots;

(b) beamsplitting means for dividing each of said sample beams into a first component and a second component, and for directing the first components of said sample beams along a first path to form corresponding first-component spots on a focal surface in said first path, and for directing the second components of said sample beams along a second path to form corresponding second-component spots on a focal surface in said second path, the first-component and second-component spots thereby formed from each sample beam having a predetermined width, each first-component and second-component spot having an irradiance that is characteristic of the corresponding portion of the optical beam wavefront that is represented by the sample beam from which said first-component and second-component spots are formed;

(c) means for performing a one-dimensional integration across substantially the entire width of each of said first-component and second-component spots, the irradiance integration for each first-component and second-component spot being performed independently along a first integration axis and a second integration axis;

(d) a first linear array of time-integrating photodetectors positioned in said first path generally orthogonally with respect to said first integration axis, and a second linear array of time-integrating photodetectors positioned in said second path generally orthogonally with respect to said second integration axis, the photodetectors of said first linear array generating signals responsive to the integrated irradiance of said first-component spots, and the photodetectors of said second linear array generating signals responsive to the integrated irradiance of said second-component spots; and (e) means for processing said signals, and for calculating a measure of position for each sample beam from said signals.

2. The apparatus of claim 1 wherein said means for producing said plurality of sample beams and for converging said sample beams to form said corresponding focussed sample beam spots comprises catoptric means including a concave reflective surface positioned to expand said optical beam wavefront, a plurality of diffraction gratings being provided on said concave reflective surface, said diffraction gratings being separated from each other so that corresponding sample portions of said optical beam wave front are incident upon said diffraction gratings, each diffraction grating producing a zeroth-order diffraction compnent and higher-order diffraction components of the corresponding sample portion of said optical beam wavefront incident thereon said concave reflective surface being configured to converge a particular higher-order diffraction component of each of said sample portions of said optical beam wavefront, the particular higher-order diffraction components of said sample portions of said optical beam wavefront being said plurality of sample beams.

3. The apparatus of claim 1 wherein said means for performing said one-dimensional irradiance integration across substantially the entire width of each of said first-component and second-component spots comprises a first scanning mirror positioned in said first path and a second scanning mirror positioned in said second path, said first scanning mirror being ditherable about an axis parallel to said first linear array of photodetectors and said second scanning mirror beig ditherable about an axis parallel to said second linear array of photodetectors.

4. The apparatus of claim 1 wherein said menas for performing said one-dimensional irradiance integration across substantially the entire width of said first-component and second-component spots comprises a first cylinder lens positioned in said first path to intercept and first component of said sample beams and a second cylinder lens positioned in said second path to intercept said components of said sample beams, said first cylinder lens elongating said first components of said sample beams along an axis parallel to said first linear array of photodectors and said second cylinder lens elongating said second components of said sample beams along an axis parallel to said second linear array of photodetectors.

5. The apparatus of claim 1 wherein each photodetector of said first an second linear arrays of photodetectors has an aspect ratio larger than unity with a larger dimension parallel to the integration axis along which said one-dimensional irradiance integration is performed and a shorter dimension parallel to the linear array of which said photodetector is a member.

6. The apparatus of claim 1 further comprising a plurality of first and second linear arrays of time-integrating photodetectors, said plurality of first linear arrays of photodetectors and said plurality of second linear arrays of photodetectors being capable of being multiplexed and of being interrogated in parallel.

7. A method for sensing aberrations in an optical beam wavefront, said comprising the steps of:

(a) producing a plurality of sample beams, each sample beam having a wavefront representing a corresponding portion of the optical beam wavefront in which said aberrations are to be sensed, and converging said sample beams to form corresponding focussed sample beam spots;

(b) dividing each of said sample beam into a first component and a second component, and directing the first components of said sample beams along a first path to form corresponding first-component spots on a focal surface in said first path, and directing the second components of said sample beams along a second path to form corresponding second-compnent spots on a focal surface in said second path, the first-component and second-component spots thereby formed from each sample beam having a predetermined width, each first-component and second-component spot having an irradiance that is characteristic of the corresponding portion of the optical beam wavefront that is represented by the sample beam from which said first-component and second-component spots are formed;

(c) performing a one-dimensional irradiance integration across substantially th eentire width of eachof said first-component and second-component spots, the irradiance integration for each first-component and second-component spot being performed independently along a first integration axis and a second integration axis;

(d) positioning a first linear array of time-integrating photodetectors in said first path generally orthogonally with respect to said first integration axis, and positioning a second linear array of time-integrating photodetectors in said second path generally orthogonally with respect to said second integration axis, the photodetectors of said first linear array generating signals responsive to the integrated irradiance of said first-component spots, and the photodetectors of said second linear array generating signals responsive to the integrated irradiance of said second-component spots; and (e) processing said signals and calculating a measure of position for each sample beam from said signals.

8. The method of claim 7 wherein said plurality of sample beams is produced by using a catoptric system that includes a concave reflective surafce to expand said optical beam wavefront, said concave reflective surface having a plurality of diffraction gratings provided thereon, said diffraction gratings being separated from each other so that corresponding sample portions of said optical beam wavefront are incident upon said diffraction gratings, each diffraction grating producing a zeroth-order diffraction component and higher-order diffraction components of the corresponding sample portion of said optical beam wavefront incident thereon, said concave reflective surface being configured to converge a particular higher-order diffraction component of each of said sample portions of said optical beam wavefront, the particular higher-order diffraction components of said sample portions of said optical beam wavefront being said plurality of sample beams.

9. The method of claim 7 wherein said one-dimensional irradiance integration across substantially the entire width of each of said first-component and second-component spots is performed by:
  (a) positioning a first scanning mirror in said first path, and dithering said first scanning mirror about an axis parallel to said first linear array of photodetectors; and
  (b) positioning a second scanning mirror insid second path, and dithering said second scanning mirror about an axis parallel to said second linear array of photodetectors.

10. The method of claim 7 wherein said one-dimensional irradiance integration across substantially the entire width of each of said first-component and second-component spots is performed by:
  (a) positioning a first cylinder lens in said first path to intercept said first components said sample beams, said first cylinder lens thereby elongating said first components of said sample beams along an axis parallel to said first linear array of photodetectors; and
  (b) positioning a second cylinder lens in said second path to intercept said second components of said sample beams, said second cylinder lens thereby elongating said second compnents of said sample beams along an axis parallel to said second linear array of photodetectors.

11. The method of claim 7 wherein the measure for each of said sample beams is calculated from said signals responsive to the irradiance of the first-component and second-component spots formed from each sample beam using a centroid-measuring algorithm.

* * * * *